No. 832,386. PATENTED OCT. 2, 1906.
J. R. HUGHES.
WASHER.
APPLICATION FILED JULY 26, 1905.
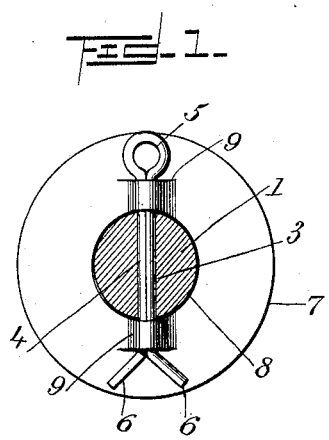
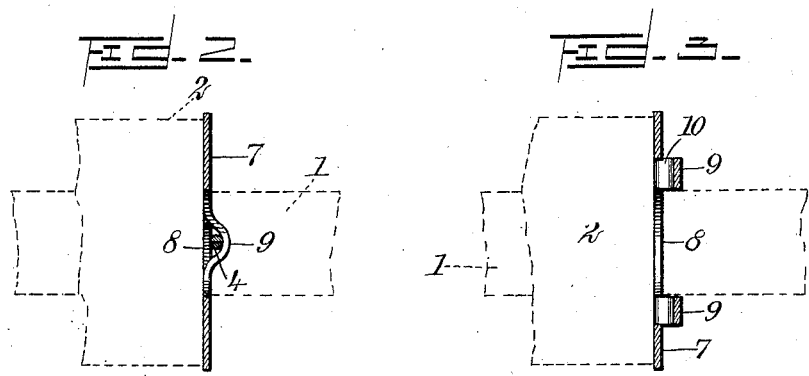
WITNESSES:
INVENTOR
John Richard Hughes
BY
ATTORNEYS

UNITED STATES PATENT OFFICE.

JOHN RICHARD HUGHES, OF CHAMA, TERRITORY OF NEW MEXICO, ASSIGNOR TO J. R. HUGHES INVENTION CO., OF CHAMA, TERRITORY OF NEW MEXICO.

WASHER.

No. 832,386.      Specification of Letters Patent.      Patented Oct. 2, 1906.

Application filed July 26, 1905. Serial No. 271,312.

*To all whom it may concern:*

Be it known that I, JOHN RICHARD HUGHES, a citizen of the United States, and a resident of Chama, in the county of Rio Arriba and Territory of New Mexico, have invented a new and Improved Washer, of which the following is a full, clear, and exact description.

This invention relates to washers; and it consists, substantially, in the features of improvement hereinafter more particularly described, and pointed out in the claims.

The invention has reference to washers intended more especially for use in connection with cotter-pins employed as fastenings for various devices or structures, and has for its object to provide a washer of the character referred to which is both simple in construction and comparatively inexpensive to manufacture, besides being light in weight, strong and durable, and possessing the capacity for long and repeated service.

In the accompanying drawings, forming a part of this specification, similar reference characters designate similar parts in all the views, and in which—

Figure 1 is an outer face view of a washer embodying my improvements and showing the application of the washer to an ordinary cotter-pin employed as a fastening for parts of a structure. Fig. 2 is a horizontal transverse sectional view of the washer and cotter-pin, showing the parts fastened together by the latter in dotted lines, and Fig. 3 is a vertical sectional transverse view taken substantially at right angles to Fig. 2.

Before proceeding with a more detailed description it may be stated that in the form of my improvements herein shown I employ an ordinary cotter-pin for fastening together two or more parts of a structure having either movable or stationary relation to each other, and in connection with the cotter-pin I employ a washer of special construction so adapted to the said cotter-pin as to prevent either bending, breaking, or undue wearing thereof from frictional contact therewith of any of the parts of the structure with which my improvements may be associated.

Reference being had to the drawings by the designating characters thereon, 1 represents, for instance, an ordinary wheel-axle, on which is placed or mounted in the usual manner an ordinary hub 2 (shown in dotted lines in Figs. 2 and 3) of a wheel, said hub having movable relation to said axle. The axle 1 is formed therethrough at a suitable point beyond the hub with an opening 3, through which is inserted an ordinary cotter-pin 4, the extremities whereof at one end are united by an ordinary loop 5 and those at the other end being bent oppositely or laterally at 6, so as to prevent the cotter-pin from working out of the said opening 3. This is a common way of utilizing the ordinary cotter-pin as a fastening between parts of a structure; but, as is well understood, the cotter-pin frequently becomes broken from different causes—as, for instance, undue friction thereon or abrading contact therewith of some part of the structure with which the same may be associated or else by forcible or striking contact therewith of external bodies. In order to overcome these disadvantages, as well as to increase the longevity of such form of fastening for various purposes, I employ in connection with the cotter-pin a washer 7, shown in the present instance as having a central circular opening 8 to enable the washer to be placed over the axle 1 prior to the insertion through the opening in the axle of the cotter-pin, such washer being provided with offsets 9, which project from the outer face thereof at opposite sides of the opening 8 and which are in alinement with each other and provided with openings 10, coinciding with each other diametrically of said opening. In applying the washer to the axle 1, for instance, the same is turned thereon so as to bring the openings 10 of the offsets 9 into alinement with the opening 3 extending through the said axle, and then the free extremities of the members of the cotter-pin are inserted through all of the said openings, after which said extremities are bent outwardly, as already explained, by which to prevent loss of the cotter-pin and to maintain the desired operative relation of the said washer 7 to the said cotter-pin.

The offsets 9 on the outer face of washer are formed by striking up portions of the metal of the washer at the desired places thereof, by which to derive the object sought. As shown in the drawings, the offsets are formed by slitting the washer on opposite sides of the opening and at a suitable distance therefrom and then bending the material between the slits and the opening outwardly, while the offsets are preferably disposed directly at opposite portions of the edges or walls of the opening 8; but it is apparent that the same may be located at any point between the said edges or walls and the perimeter of the washer with equal effect.

While the washer is intended more especially for use in connection with cotter-pins, it is apparent that the same is equally adapted for use in connection with ordinary pins or bolts frequently employed as a means for uniting together different parts of various devices or structures.

Having thus described my invention, I claim as new and desire to secure by Letters Patent—

1. A washer having a central opening and provided on opposite sides of the opening with slits, the material between the slits and opening being bent outwardly to form apertured offsets.

2. A washer provided with a central opening and having the material on the opposite sides of the opening bent outwardly to form apertured offsets.

In testimony whereof I have signed my name to this specification in the presence of two subscribing witnesses.

JOHN RICHARD HUGHES.

Witnesses:
   THOMAS A. GRAHAM,
   JOHN W. ARROWSMITH.